United States Patent
Michiels et al.

(10) Patent No.: US 8,670,559 B2
(45) Date of Patent: Mar. 11, 2014

(54) WHITE-BOX IMPLEMENTATION

(75) Inventors: Wilhelmus P. A. J. Michiels, Eindhoven (NL); Paulus M. H. M. A. Gorissen, Eindhoven (NL)

(73) Assignee: Irdeto Corporate B.V. (NL)

( * ) Notice: Subject to any disclaimer, the term of this patent is extended or adjusted under 35 U.S.C. 154(b) by 248 days.

(21) Appl. No.: 12/921,064

(22) PCT Filed: Feb. 27, 2009

(86) PCT No.: PCT/IB2009/050795
§ 371 (c)(1),
(2), (4) Date: Jan. 11, 2011

(87) PCT Pub. No.: WO2009/109880
PCT Pub. Date: Sep. 11, 2009

(65) Prior Publication Data
US 2011/0150213 A1 Jun. 23, 2011

(30) Foreign Application Priority Data
Mar. 5, 2008 (EP) .................................. 08152276

(51) Int. Cl.
*H04L 29/06* (2006.01)
(52) U.S. Cl.
USPC ............................... 380/28; 380/44; 380/277
(58) Field of Classification Search
USPC ......................................................... 380/28
See application file for complete search history.

(56) References Cited

U.S. PATENT DOCUMENTS

| | | | | |
|---|---|---|---|---|
| 2003/0070074 | A1* | 4/2003 | Geller et al. | 713/168 |
| 2005/0002532 | A1* | 1/2005 | Zhou et al. | 380/277 |
| 2007/0086586 | A1 | 4/2007 | Jakubowski et al. | 380/28 |
| 2009/0228717 | A1 | 9/2009 | Futa et al. | 713/190 |
| 2009/0252327 | A1* | 10/2009 | Ciet et al. | 380/277 |

FOREIGN PATENT DOCUMENTS

| | | | | |
|---|---|---|---|---|
| JP | H06019393 | 1/1994 | | G09C 5/00 |
| JP | 2002108210 | 4/2002 | | B41D 15/10 |
| JP | 2004502965 | 1/2004 | | G09C 1/00 |
| WO | WO-99/67918 | 12/1999 | | |
| WO | WO0203605 | 1/2002 | | H04L 9/06 |
| WO | WO2007031894 | 3/2007 | | H04L 9/06 |
| WO | WO-2007/105126 A2 | 9/2007 | | |
| WO | WO2007126049 | 11/2007 | | H04L 9/10 |

OTHER PUBLICATIONS

Cohen et al., "Efficient Elliptic Curve Exponentiation Using Mixed Coordinates", 1998, pp. 51-65.*

(Continued)

*Primary Examiner* — Taghi Arani
*Assistant Examiner* — Thaddeus Plecha
(74) *Attorney, Agent, or Firm* — Hayes Soloway P.C.

(57) ABSTRACT

A system for enabling a device to compute an outcome of an exponentiation $C^x$ having a base C and/or an exponent x, the system comprising means for establishing a plurality of values $\lambda_i$; means for establishing a plurality of values $\omega_i$ satisfying $\omega_i = C^{\lambda_i}$; means for establishing a plurality of values $\phi_i$ satisfying that the sum of the values $\lambda_i \phi_i$ equals x; and an output for providing the device with the plurality of values $\phi_i$. A device computes an outcome of the exponentiation $C^x$. The device comprises means for computing a product of the values $\omega_i$ to the power of $\phi_i$. The device is arranged for using the product as a result of the exponentiation $C^x$.

15 Claims, 6 Drawing Sheets

(56) References Cited

OTHER PUBLICATIONS

"International Application No. PCT/IB2009/050795, International Search Report and Written Opinion mailed Jun. 30, 2009", 10 pgs.

Chow, S, et al., "A White-Box DES Implementation for DRM Applications", In ACM CCS-9 Workshop DRM, (2002).

Chow, Stanley, et al., "White-Box Cryptography and an AES Implementation", 9th Annual International Workshop, SAC 2002, St. John's Newfoundland, Canada, (Aug. 15-16, 2002), 250-270.

De Rooij, P., "Efficient Exponentiation Using Precomputation and Vector Addition Chains", Lecture Notes in Computer Science, Springer Verlag, Berlin, vol. 950, (May 9, 1994), 389-399.

Menezes, A., et al., "Chapter 14: Efficient Implementation ED", Handbook of Applied Cryptography, CRC Press Series on Discrete Mathematics and its Applications, CRC Press, Boca Raton, FL, (Jan. 1, 1997), 591-635.

Moller, B., "Improved Techniques for Fast Exponentiation", Lecture Notes in Computer Science, Springer Verlag, Berlin, vol. 2587, (Nov. 28, 2002), 298-312.

Japanese Office Action issued in related U.S. Appl. No. 2010-549216, dated May 29, 2013 (6 pgs).

Sato et al., "Reducing Data Size of Table Network Implementation of Block Cipher Software" (w/o English translation), The 2005 Symposium on Cryptography and Information Security, Maiko Kobe, Japan, Jan. 25-28, 2005, The Institute of Electronics, Information and Communication Engineers (8 pgs).

Plasmans, M., "Master's Thesis, White-box Cryptography for Digital Content Protection," Technische Universiteit Eindhoven, Department of Mathematics and Computer Science, May 2005 (31 pgs).

\* cited by examiner

WHITE-BOX IMPLEMENTATION

PRIORITY CLAIM TO RELATED APPLICATIONS

This application is a national stage application under 35 U.S.C. §371 of PCT/IB2009/050795, filed Feb. 27, 2009, and published as WO 2009/109880 A1 on Sep. 11, 2009, which claims priority to European Application No. 08152276.5, filed Mar. 5, 2008, which applications and publication are incorporated herein by reference and made a part hereof in their entirety, and the benefit of priority of each of which is claimed herein.

FIELD OF THE INVENTION

The invention relates to a method of enabling an entity to compute an outcome of an exponentiation.

BACKGROUND OF THE INVENTION

The Internet provides users with convenient access to digital content. Because of the flexibility with which content can be made available to consumers via the Internet, a current trend is to equip consumer electronics (CE) products with the capability to access the Internet to obtain media content to be rendered. Such CE products include, but are not limited to, digital set top boxes, digital TVs, game consoles, PCs and, increasingly, hand-held devices such as PDAs, mobile phones, and mobile storage and rendering devices such as portable MP3 players. The Internet is not the only medium for distributing digital content. Also other digital content distribution channels are widely used, for example using digital video broadcast (DVB) and digital audio broadcast (DAB) via satellite, terrestrial air, and/or cable networks. The use of the Internet and other digital distribution media for copyrighted content creates the challenge to secure the interests of the content provider. In particular it is desirable to have technological means available to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open and allow computer programmers to inspect the software and to make modifications to the software. In such open systems, including personal computers, some users may be assumed to have complete control over the hardware and software that provides access to the content. Also, some users may have a large amount of time and resources to attack and bypass any content protection mechanisms. As a consequence, content providers must deliver content to legitimate users across a hostile network to a community where not all users or devices can be trusted.

Typically, digital rights management systems use an encryption technique based on block ciphers that process the data stream according to a key. Such content may be decrypted by the receiver using either the same key or another key. The implementation of such ciphers in the consumer devices may be obfuscated to make it more difficult for an attacker to find out the value of the key. Examples of ciphers commonly in use for many different kinds of applications are DES, AES, RSA, and the method disclosed in WO9967918.

A software application that has been designed such that particular crucial data is hidden from such users is called a white-box implementation. In particular, a white-box implementation may be designed in such a way that it is made more difficult for an attacker to learn about the value of cryptographic keys used in the software application. Typically, white-box implementations also try to hide the data such as cryptographic keys from users having full control of the execution environment, for example by using a debugger.

In relation to key handling, for playback a media player has to retrieve a decryption key from a license database. It then has to store this decryption key somewhere in memory for the decryption of the encrypted content. This leaves an attacker two options for an attack on the key. Firstly, reverse engineering of the license database access function could result in black box software (i.e., the attacker does not have to understand the internal workings of the software function), allowing the attacker to retrieve asset keys from all license databases. Secondly, by observation of the accesses to memory during content decryption, it is possible to retrieve the asset key. In both cases the key is considered to be compromised.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002 (hereinafter, these two publications will be referred to collectively as "Chow"), disclose methods with the intend to hide the key by a combination of encoding its tables with random bijections representing compositions rather than individual steps, and extending the cryptographic boundary by pushing it out further into the containing application.

The techniques disclosed in Chow make it possible to perform cryptographic operations in software without exposing the cryptographic key to a person who can fully debug the software. In the approach of Chow, the cryptographic key is hidden by using look-up tables rather than mathematical operations, with the result that the operands of the mathematical operations do not have to be stored as such. These tables may be encoded using random bijections to further obfuscate them. The encoding of one table may be undone by the encoding of another table, or may be undone elsewhere in the program. However, not all operations are easily represented by means of a look-up table.

SUMMARY OF THE INVENTION

It would be advantageous to be able to create a white-box implementation for a wider range of algorithms. To better address this concern, in a first aspect of the invention a method is presented for enabling a device to compute an outcome of an exponentiation $C^x$ having a base C and an exponent x, the method comprising establishing (102) the base C of the exponentiation and the exponent x of the exponentiation;

establishing (104) a plurality of values $\lambda_i$, for i=1, 2, . . . , r, wherein r is an integer and r≥2;

establishing (106) a plurality of values $\omega_i$, for i=1, 2, . . . , r, satisfying $\omega_i = C^{\lambda_i}$;

establishing (108) a plurality of values $\phi_i$, for i=1, 2, . . . , r, satisfying $$x = \sum_{i=1}^{r} \lambda_i \varphi_i;$$

providing (110) the device with information indicative of the plurality of values $\omega_i$;

providing (112) the device with information indicative of the plurality of values $\phi_i$;

computing (114), by means of the device, $$P = \prod_{i=1}^{r} \omega_i^{\varphi_i}.$$

Because $P=C^x$, the method allows enabling a device to compute an outcome of an exponentiation $C^x$ without enabling the device to obtain knowledge of a base C of the exponentiation and/or an exponent x of the exponentiation. This allows to perform an exponentiation on an untrusted entity (the device) without exposing the base or the exponent to an attacker who has the capability to fully inspect or debug the entity. The base and the exponent are not exposed to the attacker, because the base and the exponent are never provided to the entity in plain format. Although the information provided to the entity is sufficient to compute the outcome of the exponentiation, it is difficult or impossible to compute the base and/or exponent from this information. The entity needs only to be provided with the values $\omega_i$ and $\phi_i$. These values are sufficient to compute the result of the exponentiation. However, from these values it is difficult to learn the value of C, because to find out C, one would need to know the values of $\omega_i$ and $\lambda_i$. It is also difficult to learn the value of x, because to find out x, one would need to know the values of $\phi_i$ and $\lambda_i$. Consequently, if the plurality of values $\lambda_i$ is kept secret, it is difficult to find either C or x. Even if C would be known by an attacker, it is still difficult to find out about x, because for this the attacker would need to compute $x=^C \log P$ or $\lambda_i=^C \log \omega_i$, for i=1, 2, . . . , r, and, depending on how the parameters and the algebraic structures are selected, it is believed that these logarithms are difficult to compute. For example, $^C \log P$ is considered difficult to compute if C is the generator of a cyclic group of high order. The exponentiation can be used, for example, in cryptographic algorithms including encryption/decryption algorithms and digital signature creation and/or validation.

In an embodiment, wherein the step of establishing a plurality of values $\lambda_i$ comprises establishing a set V of values to be used as the exponent x and establishing a plurality of sets of values $W_1, W_2 \ldots, W_r$ such that $$V \subseteq \left\{ \sum_{i=1}^{r} \lambda_i \cdot w_i \mid (w_1, w_2, \ldots, w_r) \in W_1 \times W_2 \times \ldots \times W_r \right\}.$$

The step of establishing the plurality of values $\phi_i$ comprises selecting the values $\phi_i$ such that $\phi_i \in W_i$, for i=1, 2, . . . , r. The method comprises performing the steps of establishing the plurality of values $\phi_i$, providing the device with the information indicative of the plurality of values $\phi_i$, and computing $$P = \prod_{i=1}^{r} \omega_i^{\varphi_i}$$

by means of the device, in respect of a plurality of different values $x \in V$.

This embodiment allows to efficiently use different values of x in an efficient way with the same base value C. The way in which the values $\lambda_i$ are selected in this embodiment allows any exponent x from the set V to be used without changing the $\lambda_i$. Consequently, the values of $\omega_i$ remain unchanged, and it is not necessary to re-compute them. This saves computational resources.

In a particularly efficient embodiment, $W_i=\{0,1\}$, for i=1, 2, . . . , r. Such a binary representation allows for an efficient and easy implementation. It allows the values of $\phi_i \in W_i$ to be determined efficiently.

Other advantageous aspects of the invention are defined in the independent claims. The dependent claims further define advantageous embodiments.

BRIEF DESCRIPTION OF THE DRAWINGS

These and other aspects of the invention will be further elucidated and described with reference to the drawing, in which.

DETAILED DESCRIPTION OF EMBODIMENTS

A white-box cipher is a block cipher which is well suited for a white-box implementation of a cryptographic algorithm, i.e., a software implementation for which it is difficult for an attacker to extract the cryptographic key that is used. Such white-box implementations are known to exist for symmetric block ciphers, such as AES and 3DES. However, it would also be interesting to white-box asymmetric ciphers, such as RSA and ElGamal. A typical operation in asymmetric ciphers is an exponentiation $y^x$, where y and x can both be variable and constant. In some block ciphers, the base y is more or less constant whereas the exponent x varies more often. When white-boxing such block ciphers (or, more generally, algorithms), it is advantageous if the exponent x can be efficiently changed. Also, it would be advantageous if an implementation of $y^x$ were provided in which the value of x may be hidden. In this text an approach to white-boxing block ciphers (or, more generally algorithms) is presented that has these advantages.

The white-box implementation presented herein may be made larger than a standard implementation of the exponentiation. Furthermore, it is difficult for an attacker to make the implementation smaller. This property can be advantageous in preventing unauthorized copying or distribution of the software implementation.

WO 2007/105126 discloses a method and system for including a given binary string in a white-box implementation of a symmetric block cipher such as AES and DES. This string inclusion can be used to bind the implementation to a platform or to forensically watermark the implementation. The white-box implementation as described in this invention allows to include given binary strings into the implementation of an exponentiation operation.

As an advantage of a white-box implementation, Chow et al. mention that a white-box implementation can effectively be bound to the remainder of the program. More precisely, by applying external encodings to the input values and/or output values of an algorithm, it is prevented that an attacker can easily understand and/or extract the complete white-box implementation from a software program. Also this technique can be applied to the white-box implementation of exponentiation as disclosed in this description.

In this description, an approach is disclosed for hiding for example the value x in an exponentiation $y^x$. Herein, y may be constant and x may be variable, however this is not a limitation. This value x remains hidden, even for an attacker who has full control over and full access to the implementation of the program that performs the exponentiation.

Figure 1:
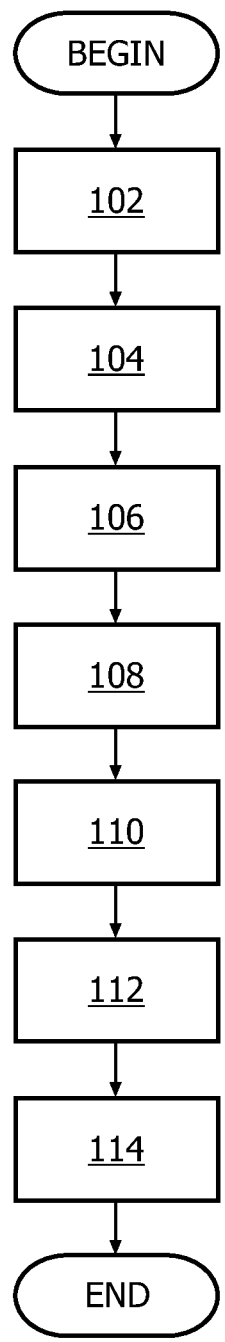
FIG. 1 is a flowchart illustrating processing steps of a method of enabling a device to compute an exponentiation.
Figure 2:
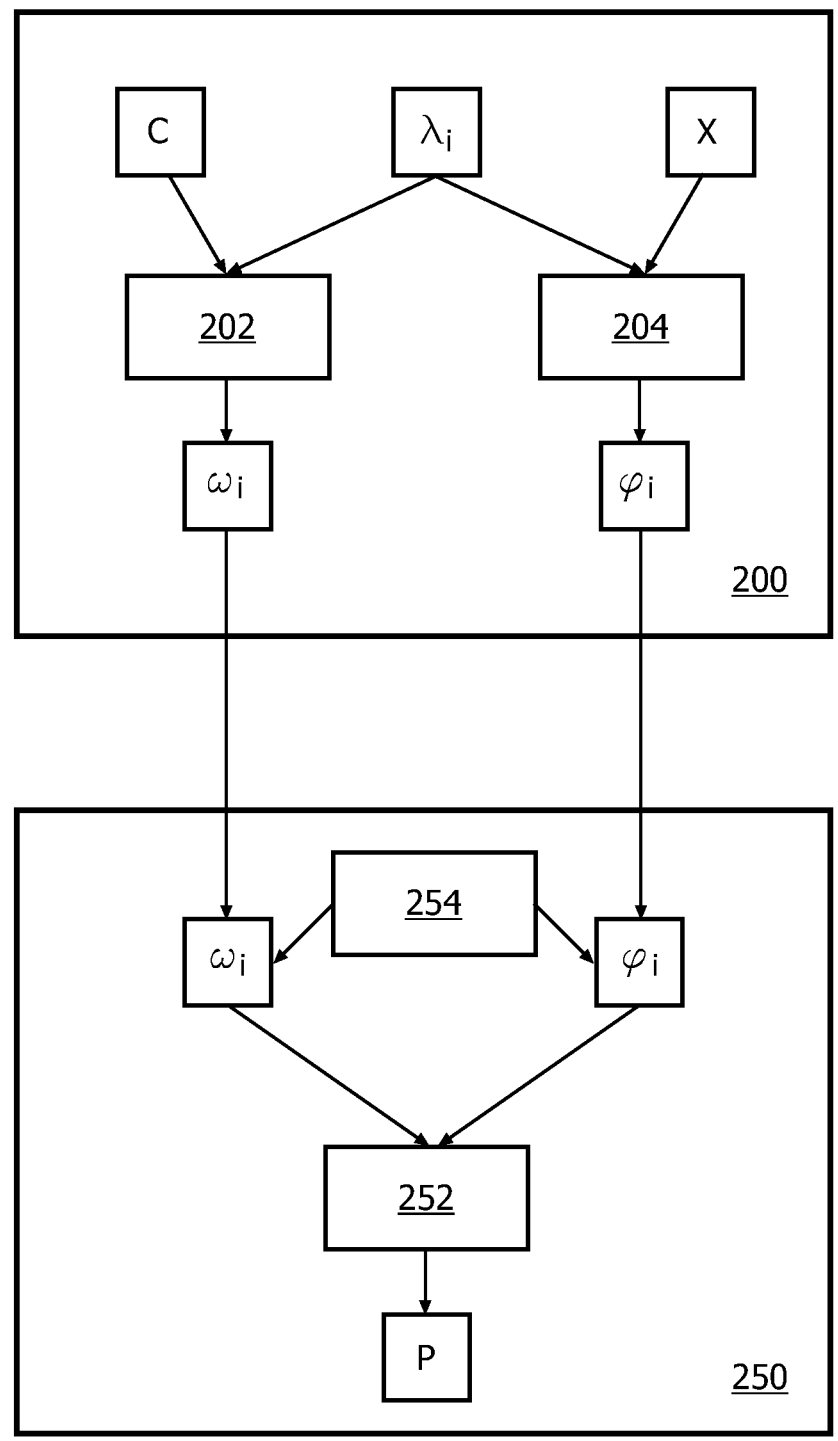
FIG. 2 is a diagram illustrating data flow and processing means operating on the data.

FIG. 1 is a flowchart illustrating processing steps according to a method of enabling a device to compute an outcome of an exponentiation $C^x$ having a base C and/or an exponent x. FIG. 2 is a diagram illustrating the flow of data and the entities and processing means operating on these data. The method of FIG. 1 will be described with reference also to FIG. 2. A method of enabling an entity 250 to compute an outcome of an exponentiation $C^x$ having a base C and/or an exponent x may be implemented, for example, within an entity 200. Preferably the entity 200 communicates via the entity 250 via a digital communications network such as the Internet, or using digital communication via cable, air, and/or satellite. Alternatively digital messages are distributed via e.g. removable media such as CD, DVD, flash memory USB-stick. The entity 200 may be a system which provides services to one or more entities 250. Such a system may be a single server computer. However, the entity 200 may be a system comprising various computers and/or devices. The entity 200 may also be implemented on a peer device communicating with a peer entity 250, wherein the peers wish to exchange information in a secure way. The entity 250 may be a device or a software application suitable for being executed on a device. Such a device may be a personal computer (PC), laptop, personal digital assistant (PDA), set-top box, digital video recorder, gaming console, or the like. Suitable applications include media players, web browsers, and software capable of performing secure transactions. The entity 250 may be arranged for processing multimedia content, e.g. audio and/or video content. The entity 250 may comprise a cryptographic unit for decrypting audio and/or video content using exponentiation disclosed in this document. The entity 250 may also or alternatively be arranged for performing other kinds of cryptographic operations such as fingerprinting or signing of messages.

The method comprises the step 102 of establishing the base C of the exponentiation and the exponent x of the exponentiation. These values C and x may follow from the context to which the method is applied. For example, C and x may be dependent on the particulars of a cryptographic algorithm and/or the key used in such an algorithm. In particular in asymmetric key cryptographic algorithms, an exponentiation usually plays a prominent role. The values of C and x may be retrieved from a database or may be derived from data stored in a database, e.g. a key for a user stored in a database may form the input to compute C and/or x. Also, the values of C and/or x may be fixed, whereas in other cases C and/or x may be variable. The values of C and/or x may be stored in a memory in the entity 200.

The method comprises the step 104 of establishing a plurality of values $\lambda_i$, for i=1, 2, ..., r, wherein r is an integer and r≥2. These values $\lambda_i$ are used later in the method to obfuscate the values of C and x. The values may be chosen randomly from a predetermined set. Also the number of values r may be chosen randomly, although the security may be increased by choosing a larger value of r. The plurality of values $\lambda_i$ may be stored at least temporarily in a memory of the entity 200.

The method comprises the step 106 of establishing a plurality of values $\omega_i$, for i=1, 2, ..., r, satisfying $\omega_i = C^{\lambda_i}$. These values $\omega_i$ are thus dependent on the values $\lambda_i$ and on C. They may be computed by an exponentiation known in the art. Such an exponentiation operation may be implemented in a computational unit 202 of entity 200, which may comprise for example computer program instructions and/or electronic circuitry.

The method comprises the step 108 of establishing a plurality of values $\phi_i$, for i=1, 2, ..., r, satisfying $$x = \sum_{i=1}^{r} \lambda_i \varphi_i.$$

These values $\phi_i$ are thus dependent on the values $\lambda_i$ and on x. They may be computed for example by using Gaussian elimination or another method of solving linear equations known in the art. This method step may be implemented in another computational unit 204 of entity 200.

The method comprises the step 110 of providing the entity 250 with information indicative of the plurality of values $\omega_i$. The method comprises the step 112 of providing the entity 250 with information indicative of the plurality of values $\phi_i$. In steps 110 and 112, the communications link and/or removable media referred to above may be employed. Alternatively, some of the values may be provided by hard-coding in the entity 250. For example, if the entity 250 is a device, the values $\omega_i$ might be stored, during manufacture time, in a read-only memory of the device. If the values should be replaced from time to time, the values may be stored in firmware, for example. The values $\omega_i$ may also be hard-coded in a software application. The values $\phi_i$ may also be stored (semi)permanently in the entity 250, however, in many applications x changes very often (depends for example on a message to be transmitted) and in such a case it may be more efficient to transmit the values via a network and store them in a random access memory in the entity 250.

The method comprises the step 114 of computing, by means of the entity 250, $$P = \prod_{i=1}^{r} \omega_i^{\varphi_i}.$$

This step is implemented in the entity 250 and replaces the computation of $C^x$ in the device. Because C and x are not exposed in step 114, the entity 250 is capable of computing the value of $C^x$ without gaining knowledge of C and/or x. This step 114 is implemented in a computational unit 252. Computational unit 252 may comprise a software module or an electric circuit for performing the step 114.

The method may be used, for example, with a fixed C and variable x. To this end, step 104 of establishing a plurality of values $\lambda_i$ may comprise establishing a set V of values to be used as the exponent x and establishing a plurality of sets of values $W_1, W_2 \ldots, W_r$ such that $$V \subseteq \left\{ \sum_{i=1}^{r} \lambda_i \cdot w_i \mid (w_1, w_2, \ldots, w_r) \in W_1 \times W_2 \times \ldots \times W_r \right\}.$$

Step 108 of establishing the plurality of values $\phi_i$ may comprise selecting the values $\phi_i$ such that $\phi_i \in W_i$, for $i=1, 2, \ldots, r$. To use different values of $x \in V$, the following steps are performed in respect of these different values of $x \in V$: step 108 of establishing the plurality of values $\phi_i$, step 112 of providing the device with the information indicative of the plurality of values $\phi_i$, and step 114 of computing P by means of the device, in respect of a plurality of different values $x \in V$. Since $$V \subseteq \left\{ \sum_{i=1}^{r} \lambda_i \cdot w_i \mid (w_1, w_2, \ldots, w_r) \in W_1 \times W_2 \times \ldots \times W_r \right\},$$

any value $x \in V$ can be expressed by properly selecting the $\phi_i \in W_i$ such that $$x = \sum_{i=1}^{r} \lambda_i \varphi_i.$$

Preferably, C is an element of a multiplicative group G, wherein C is of order q, which means that q is a smallest positive integer such that $C^q=1$. Also, preferably, C and G are selected such that q is sufficiently large. In particular q is sufficiently large if it makes the computation of $^C \log x$ sufficiently difficult to compute. When determining the extend of sufficiently difficult to compute, the amount of computational resources an attacker may have available should be taken into account. For example, q is a 1024-bit number, e.g. $q > 2^{1023}$.

In an embodiment, $W_i = \{0,1\}$, for $i=1, 2, \ldots, r$. This is a binary solution that may make the method especially easy to realize and/or more efficient, for example because it is easier to find appropriate values of $\phi_i$.

In an embodiment, the key of a cipher is established, for example by random generation or by retrieving the key from a database, and the key should be used by entity 250. However, it is undesirable to give the entity 250 explicit knowledge of the key. The method then comprises that the entity 200 establishes the base C in dependence on the key and computes and provides the appropriate values of $\omega_i$. The messages are encrypted and any occurrence of an exponent x in the message, for which the entity 250 needs to compute $C^x$ to decrypt the message, is replaced by the appropriate values of $\phi_i$. The resulting, encrypted message is provided to the entity 250. This allows the entity 250 to use the base C and exponent x in an exponentiation operation of the cipher without obtaining knowledge of the key, in particular without learning the value of C.

There may be a plurality of entities 250 that should perform the exponentiation $C^x$ with the same base C and the same exponent x. However, it may be desirable that each different entity 250 can only process data intended for that particular entity 250. Also, it may be desirable that each entity 250 is uniquely identifiable by means of the software code and/or data comprised or stored in the entity 250. To that end, the method may further comprise selecting different pluralities of values $\lambda_i$ and/or different values r. These different pluralities of values may then be used in respect of different devices but with the same values of C and x.

The entity 250 has an input, e.g. via the communications link or removable media, for receiving information indicative of at least part of the plurality of values $\omega_i$ and/or information indicative of at least part of the plurality of values $\phi_i$. A part or all of these pluralities of values may be stored in the entity 250, for example by means of a one-time configuration procedure or by hard-wiring at manufacture-time.

The part of the pluralities of values $\omega_i$ and $\phi_i$ which is not stored in the entity 250 beforehand may be provided by the entity 200. Alternatively, part or all of the values $\omega_i$ and $\phi_i$ is provided by a value provider 254. Value provider 254 accesses for example a hardware identifier of the device, a biometric measurement, and/or a password entered by the user. Value provider 254 then uses the resulting data as part or all of the values $\omega_i$ and $\phi_i$ either directly or after performing a transformation on the data.

The entity 250 may comprise a cryptographic unit for performing a cryptographic operation according to an asymmetric cipher, wherein the cryptographic operation involves the exponentiation $C^x$, wherein the means for performing the cryptographic operation is arranged for using P as the result of the exponentiation $C^x$.

The entity 250 may have an input arranged for receiving encrypted information from entity 200 indicative of at least part of the plurality of values $\omega_i$ and/or at least part of the plurality of values $\phi_i$. In that case a cryptographic unit is provided for decrypting the encrypted information to obtain, respectively, the at least part of the plurality of values $\omega_i$ and/or the at least part of the plurality of values $\phi_i$.

Figure 10:
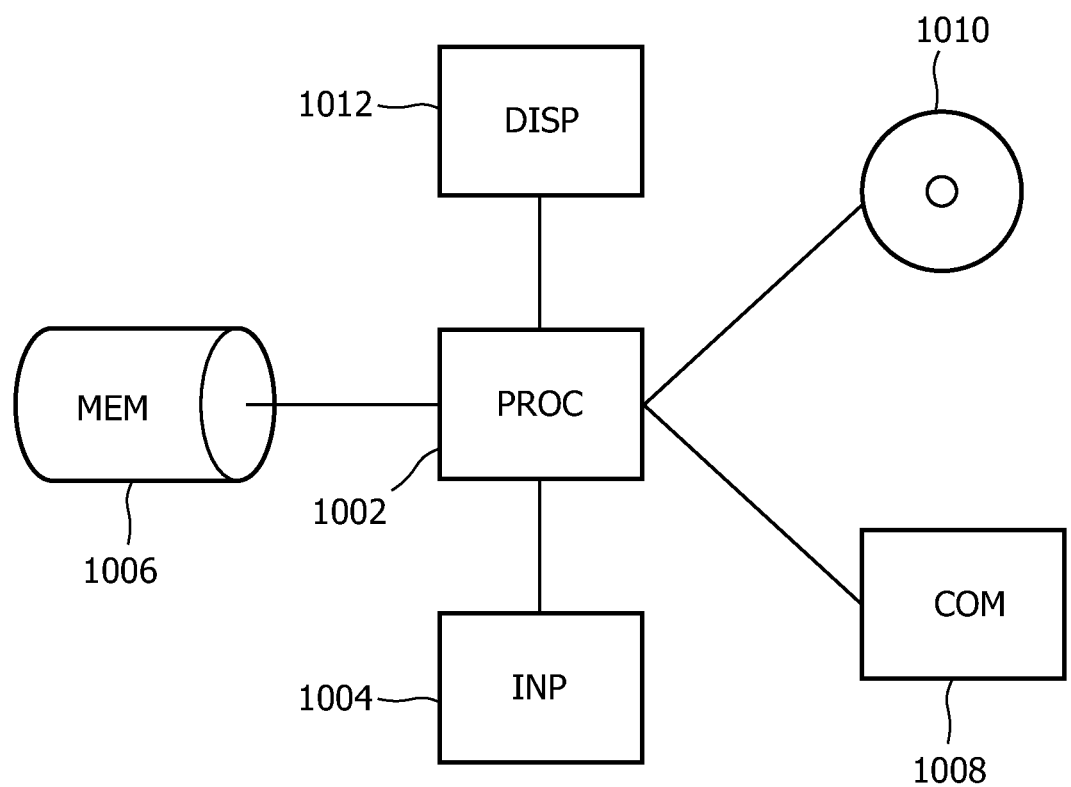
FIG. 10 illustrates an embodiment.

FIG. 10 shows a block diagram of a hardware unit that may act as the entity 250. The figure shows a processor 1002, a memory 1006 capable of storing a computer program product comprising instructions for causing the processor 1002 to perform the at least one of the methods disclosed herein. The unit comprises a user input 1004, e.g. buttons, touch screen, or remote control device and a display 1012 to provide facilities necessary for user interaction, e.g. starting a movie that is protected using digital rights management, or composing and transmitting an encrypted and/or digitally signed e-mail message. The display 1012 may also be used (in combination with audio speakers) to play video. The communications port 1008 connects to a digital network as discussed above, and/or a reader/writer of removable media 1010 is provided.

A similar hardware scheme may also be used to implement the entity 200. This diagram is only an example of a suitable hardware architecture for either entity 200 or 250, other architectures may be equally suitable. Entity 200 may be a server system comprising a plurality of servers, wherein each server may have an architecture similar to FIG. 10. It is not uncommon that key generation (which results in base C) and message encryption (which results in exponent x) occur on different servers of the server system of entity 200. It can be practical to compute the values of $\omega_i$ on the same server on which the key and/or base C is generated. Likewise, it can be practical to compute the values $\phi_i$ on the same server on which the message is encrypted and/or on which the exponent x is generated. Generation of the values of $\lambda_i$ may be performed, for example, on the server whose values need updating the least frequently: the server generating the key and/or the base C. However, the tasks may be divided in any way over one or more computers.

Let H be a group of order n, although the invention is not limited to groups. Let C∈H be an element from that group, and x a variable over a subset V of the integer numbers. In the following it is shown how to hide the precise values of C and/or x from a white-box attack when computing the value $$C^x. \tag{1}$$

Let $\lambda_1, \lambda_2, \ldots, \lambda_r$ be a collection of integer values and let $W_1, W_2, \ldots, W_r$ be sets of integers. Furthermore, let these values span V in the following way:

$$V \subseteq \left\{ \sum_{i=1}^r \lambda_i \cdot w_i \mid (w_1, w_2, \ldots, w_r) \in W_1 \times W_2 \times \ldots \times W_r \right\}.$$

Furthermore, for an element v from V define $f_i(v)$ as the factor $w_i$ with which $\lambda_i$ may be multiplied to obtain v, i.e., $$v = \sum_{i=1}^r \lambda_i \cdot f_i(v).$$

For each i with $1 \leq i \leq r$, define $\omega_i = C^{\lambda_i}$.
Then, (1) may be computed as $$\prod_{i=1}^r \omega_i^{f_i(x)}. \tag{2}$$

Note that if $C^x$ is implemented in this way, the implementation uses $f(x)=(f_1(x), f_2(x), \ldots, f_r(x))$ as input instead of x. That is, the input x is encoded. In other words, the input f(x) represents x, but it is difficult to derive the actual value of x from f(x). By providing f(x) and the $\omega_i$ to the white-box implementation, the white-box implementation is enabled to compute $C^x$ using formula (2). Because it is not necessary to provide x explicitly, the value of x can remain hidden for the attacker of the white-box implementation.

It can be shown that if the values $\lambda_i$ are unknown to an attacker, then it may be difficult for an attacker to derive the values C and x. Furthermore, if the values $\lambda_i$ are unknown and C is known, then it is still difficult to derive x, in particular if H and/or C are selected such that it is difficult to compute $^C$log P. For example, if H is a sufficiently large cyclic group and if C is a generator of this group, it is difficult to compute the logarithm $^C$log P. The logarithm is also difficult to compute if the order of C is sufficiently large, wherein the order of C is the smallest positive integer q for which $C^q=1$. Other instances where it is difficult to compute the logarithm is difficult to compute will be apparent to the person skilled in the art, and this property may be used to advantage to apply the exponentiation according to the method presented herein.

Besides hiding the precise value of x in (1), the proposed white-box implementation of an exponentiation has the property that it allows to include a binary string into the parameters. For example, by changing the value $\lambda_i$, the value $\omega_i$ changes as well. This property may be used for including a particular binary string (to be derived from e.g. a hardware identifier, or a portion of computer executable code) in at least one of the values $\omega_i$. This would allow a white-box implementation in which only some of the $\omega_i$ are provided to the white-box implementation, e.g. via a secure server, and at least part of at least one of the $\omega_i$ are extracted from the execution environment by the white-box implementation. This would allow to provide a set of $\omega_i$ that can only be used by the target execution environment and that is useless outside the execution environment for which the $\omega_i$ were intended.

Also, it is possible to bind the white-box implementation of the exponentiation operation to the surrounding program by letting the surrounding program receive values f'(x) that have been transformed according to a function f' for some $\lambda'_1, \lambda'_2, \ldots, \lambda'_r$. The surrounding program then transforms the received values f'(x) into corresponding values f(x) based on the values $\lambda_1, \lambda_2, \ldots, \lambda_r$ (t need not be equal to r), and performs the exponentiation operation based on the latter values f(x). More generally, the input to the white-box implementation may comprise some encoded version g(x) of x, wherein the white-box implementation transforms g(x) into f(x) before applying the exponentiation. An attacker then not only needs the white-box implementation, but also this transformation, in order to obtain information about the exponent x and/or base C. The white-box implementation can also be bound to the surrounding program by multiplying one or more values $\omega_i$ by some secret value and by undoing this operation somewhere else in the program.

Hereinafter, a detailed embodiment will be disclosed. This embodiment is based on a generalization of the ElGamal public key cipher. The ElGamal public key cipher is known in the art. Briefly, it can be described as follows.

Key Generation:
Select a cyclic group G of order n with generator α. An example of such a group is the multiplicative group of integers modulo a large prime p.
Select a random integer a with $1 \leq a \leq n-1$ and compute the group element $\alpha^a$.
Public key: α, $\alpha^a$
Private key: a
Encryption of message m∈G:
Select a random integer k with $1 \leq k \leq n-1$, and compute the group elements $\gamma = \alpha^k$ and $\delta = m \cdot (\alpha^a)^k$.
The ciphertext is given by (γ,δ).
Decryption of ciphertext (γ,δ):
Compute $\gamma^{-a}$.
Message m is given by $\gamma^{-a} \cdot \delta$ as $\gamma^{-a} \cdot \delta = (\alpha^k)^{-a} \cdot m \cdot (\alpha^a)^k = m$.

Figure 3:
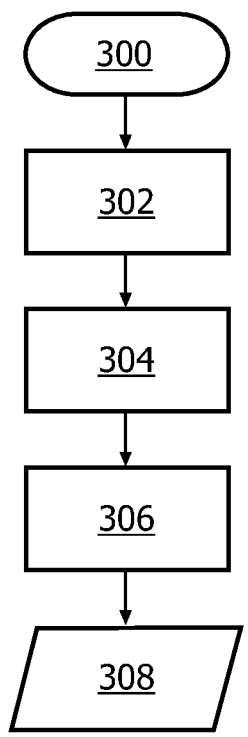
FIG. 3 is a flowchart illustrating a method of key generation.
Figure 4:
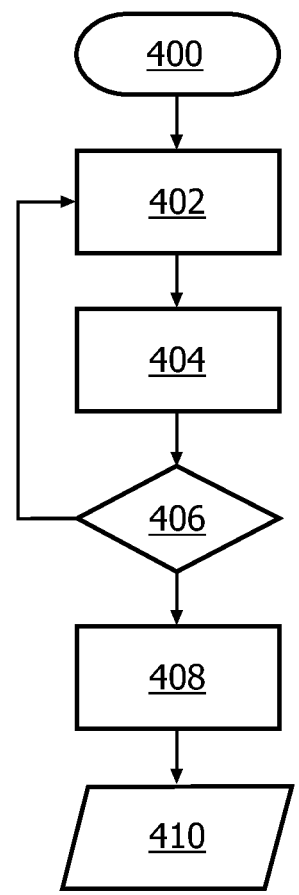
FIG. 4 is a flowchart illustrating a method of message encryption.
Figure 5:
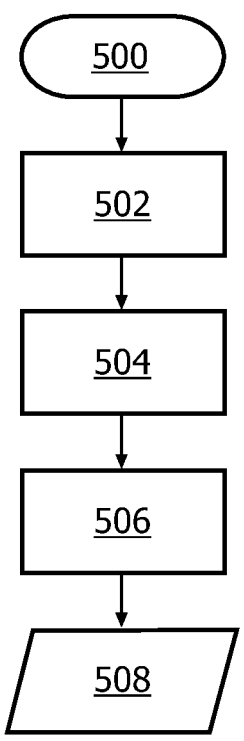
FIG. 5 is a flowchart illustrating a method of decryption of ciphertext.

FIGS. 3-5 illustrate an embodiment of the invention. The Figures illustrate a white-box implementation of an asymmetric cipher. More particularly, it illustrates a white-box implementation of a generalization of the ElGamal public key cipher. However, this embodiment is provided as an example only. The invention is not limited to either ElGamal or asymmetric ciphers. As indicated, in this embodiment, a white-box implementation of a generalization of ElGamal is disclosed. This generalization, however, not necessarily affects the black-box security of the cipher, i.e., the cipher is believed to be at least as secure as the original ElGamal block cipher. The generalized ElGamal cipher is defined as follows.

Key generation (step 300 in FIG. 3):
Select a cyclic group G of order n with generator α. (step 302)
Select random integer a with $1 \leq a \leq n-1$ and compute the group elements $\alpha^a$ (step 304).
Select a function g from G to $\{0, 1, 2, \ldots, n-1\}$ (step 306). In order to enable a strong white-box implementation the function g need not be bijective, but its range should be large, preferably.

Public key: α, α$^a$, g

Private key: a

The public key and private key are stored in step 308.

Encryption of message m∈G (step 400 in FIG. 4):

Select a random integer $k_1$ with $1 \leq k_1 \leq n-1$, and compute the group element γ=α$^{k_1}$ (step 402).

Define $k_2$=g(γ) (step 404). If $k_2$=0, then select a different $k_1$ (step 406).

Compute the group element δ=m·(α$^a$)$^{k_1}$·α$^{k_2}$ (step 408).

The ciphertext is given by (γ,δ) (step 410).

Decryption of ciphertext (γ,δ) (500 in FIG. 5):

Compute $k_2$=g(γ). (step 502)

Compute γ$^{-a}$ and α$^{-k_2}$ (steps 504 and 506, respectively).

Message m is given by γ$^{-a}$·α$^{-k_2}$·δ (step 508).

It is possible to derive white-box implementations of the exponentiation operations α$^{k_2}$ (step 408) and α$^{-k_2}$ (step 506) in which the value $k_2$ is hidden.

Figure 6:
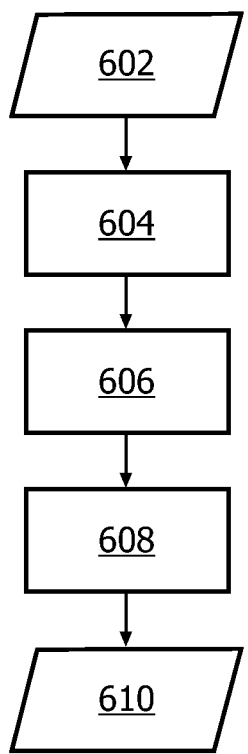
FIG. 6 is a flowchart illustrating a method of white-boxing an exponentiation $\alpha^{k_2}$.
Figure 7:
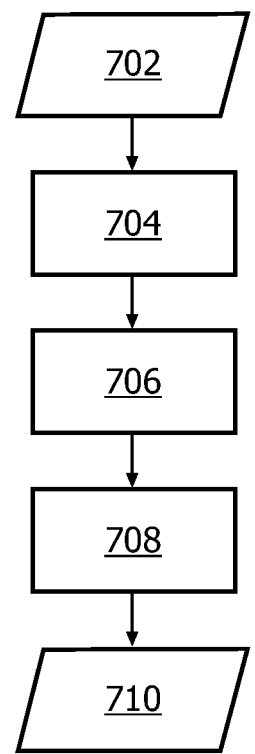
FIG. 7 is a flowchart illustrating a method of white-boxing an exponentiation $\alpha^{-k_2}$.

FIG. 6 illustrates a way of white-boxing the exponentiation α$^{k_2}$ (step 408). FIG. 7 illustrates a way of white-boxing the exponentiation α$^{-k_2}$ (step 506). These ways of white-boxing are non-limiting examples only. The exponentiation operation α$^{k_2}$ will be described first.

Let m=⌈$\log_2 n$⌉ be an estimate of the length of a bit string providing a binary representation of a number between 0 and n−1 (step 604).

Define values $\lambda_1, \lambda_2, \ldots, \lambda_r$ and $W_1, W_2, \ldots, W_r$ such that each value in the range of $k_2$ (step 606), i.e., each value between 1 and n−1, can be written as $$\sum_{i=1}^{r} w_i \cdot \lambda_i$$

with $(w_1, w_2, \ldots, w_r) \in W_1 \times W_2 \times \ldots \times W_r$. This holds, for example, for m=r, $W_i$={0,1} and $\lambda_i$=b·2$^i$, where b is a randomly selected integer between 1 and n−1. This may be appreciated by observing that if function f(x) is defined as the linear function f(x)=b$^{-1}$x and if $f_i$(x) is the i$^{th}$ bit of f(x), then $$x = \sum_{i=1}^{m} \lambda_i \cdot f_i(x)$$

for an arbitrary x.

Define $\omega_i$=α$^{-\lambda_i}$ and compute α$^{k_2}$ by $$\prod_{i=1}^{m} \omega_i^{f_i(k_2)}$$

(step 608). Hence, the white-box implementation of the exponentiation operation has as an input (step 602) the encoded version f($k_2$)=b$^{-1}$$k_2$ of $k_2$ and it returns α$^{k_2}$ (step 610).

FIG. 7 illustrates a way to white-box the exponentiation α$^{-k_2}$. This is intended to be a non-limiting example only. To distinguish from the above white-box implementation, different notation is used: $\mu_i$ is used instead of $\lambda_i$ and g is used instead of f. The sets $W_i$ may be the same for both white-box implementations, i.e., {0,1}.

Define $\mu_i$=c·2$^i$ for a randomly selected integer c between 1 and n−1 (step 704). Furthermore, define the linear function g(x)=c$^{-1}$x and let $g_i$(x) denote the i$^{th}$ bit of g(x) (step 706).

From that it follows that any relevant value of x may be expressed as $$x = \sum_{i=1}^{m} \mu_i \cdot g_i(x).$$

Define $\upsilon_i$=α$^{-\mu_i}$ and compute α$^{-k_2}$ by $$\prod_{i=1}^{m} \upsilon_i^{g_i(k_2)}$$

(step 708). Hence, the white-box implementation has as input g($k_2$)=c$^{-1}$$k_2$ (step 702) and returns α$^{-k_2}$ (step 710).

Using these two white-boxed exponentiation operations, it is possible to specify a white-box implementation of the encryption and decryption operations of the generalized ElGamal cipher, for example.

Figure 8:
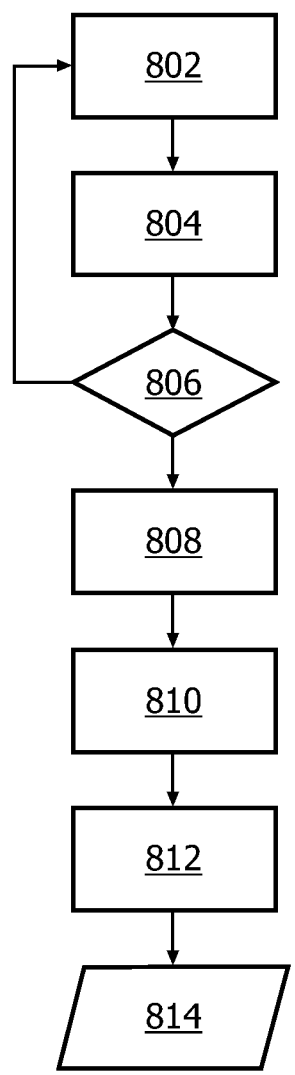
FIG. 8 is a flowchart illustrating a method of obtaining a white-box implementation of an encryption algorithm.

FIG. 8 illustrates an example of how to obtain a white-box implementation of the encryption algorithm.

Select a random integer $k_1$ with $1 \leq k_1 \leq n-1$ (step 802), and compute the group element γ=α$^{k_1}$ in the standard way (i.e., non-white-boxed, step 804). However, a white-boxed implementation may be used as well.

It holds that γ=f($k_2$) or, equivalently, $k_2$=f$^{-1}$(γ), although these values need not be computed. Herein, f$^{-1}$ corresponds to the function g used in steps 404 and 502 above. If γ=0 (which is equivalent to $k_2$=0 as g is bijective and linear), then select a different $k_1$ (step 806).

The value (α$^a$)$^{k_1}$ is computed in the standard way (i.e., non-whiteboxed, step 808). However, a white-boxed implementation may be used as well.

The value α$^{k_2}$ is computed via $$\prod_{i=1}^{m} \omega_i^{\gamma_i}$$

(step 810). Note that $\gamma_i$=$f_i$($k_2$).

Compute the group element δ=m·(α$^a$)$^{k_1}$·α$^{k_2}$ (step 812), using the result of step 808.

The ciphertext is given by (γ,δ) (step 814).

Figure 9:
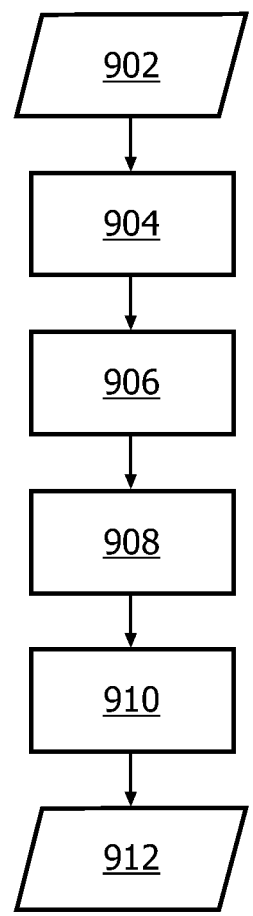
FIG. 9 is a flowchart illustrating a method of obtaining a white-box implementation of a decryption algorithm.

FIG. 9 illustrates how to obtain a white-box implementation of the decryption algorithm.

The value c$^{-1}$·b is given (step 902). This value is used to determine the composed function g∘f$^{-1}$(x)=c$^{-1}$·b·x (step 904).

It uses this composed function to compute g($k_2$)=g∘f$^{-1}$(γ). (step 906)

The value γ$^{-a}$ is computed in the standard way (i.e., non-whiteboxed, step 908). However, a white-boxed implementation may be used as well.

The value α$^{-k_2}$ is computed via $$\prod_{i=1}^{m} \upsilon_i^{g_i(k_2)}$$

(step 910).

Message m is provided by γ$^{-a}$·α$^{-k_2}$·δ (step 912).

In a white-box implementation, the key may be hidden, e.g. embedded in the implementation, and it may not be easy to replace the key. The white-box implementation described above in respect of a generalized version of ElGamal may be constructed in such a way that the value a and the functions g and f are not easily replaced. Moreover, it is easy to construct the white-box implementation described above in respect of a generalized version of ElGamal in such a way that the value "a" can still be varied easily. In such a case, the key generation of the block cipher, described in respect of FIG. 3, is preferably arranged as follows:

Values $\alpha$, g and f are fixed.
Public key: $\alpha$, $\alpha^a$
Private key: a By changing the value $\lambda_i$ ($\mu_i$), in general the value $\omega_i$ ($\upsilon_i$) may change as well. Hence, if a set of m devices is given and if it is desired to bind the proposed white-box implementation to each of these devices, then this may be achieved in the following way. For some i, $1 \leq i \leq r$, choose m different respective values of $\lambda_i$ ($\mu_i$), compute the m respective associated values $\omega_i$ ($\upsilon_i$) and assign those m respective associated values $\omega_i$ ($\upsilon_i$) to the respective m devices, for example by setting a hardware identifier of the respective devices to (or in dependence on) the respective associated values $\omega_i$ ($\upsilon_i$).

To include a given string in the white-box implementation, and more particularly in the representation of $\omega_f$ and/or $\upsilon_f$ on a device, one may proceed as follows. Suppose that one intends to include into the implementation a 32-bit bit string s. More particularly, one would like to use this bit string as representation of $\omega_i$ ($\upsilon_i$). Then the probability that the first 32 bits of, say, $\omega_f$ ($\upsilon_f$) are given by s will probably be around $\frac{1}{2}^{32}$ if $\lambda_i$ ($\mu_i$) is randomly selected. Hence, by using a trial-and-error approach, one may find after probably at most $2^{32}$ attempts an implementation in which the first 32 bits of $\omega_f$ ($\upsilon_f$) match bit string s. Such a feature may be used, or example, to bind the data indicative of $\omega_f$ and/or $\upsilon_f$ to a particular target device, by leaving out some string known to be present on the target device, and preferably not present on most or all other devices. For example, some string could be based on the MAC address, hard disk ID, or another kind of hardware identifier. Also, the string could be based on machine name. To bind the data indicative of $\omega_f$ and/or $\upsilon_f$ to a particular person, some string could be based on a user ID or password or a biometric measurement, for example. By including that string to the white-box implementation as indicated, the white-box implementation could not be easily used on another device or by another person.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

Any reference to "random numbers" should be interpreted as including pseudo-random numbers such as those generated by deterministic algorithms.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of enabling a device to compute an outcome of an exponentiation $C^x$ having a base C and an exponent x by means of a white-box implementation of the exponentiation, the method comprising
   establishing, in a computer processor, the base C of the exponentiation and the exponent x of the exponentiation, comprising establishing the base C in dependence on a key of a cipher, wherein the key of the cipher is to be used by the device for performing a crytographic operation;
   establishing, in the computer processor, a plurality of values $\lambda_i$, for i=1, 2, . . . , r, wherein r is an integer and r≥2;
   establishing, in the computer processor, a plurality of values $\omega_i$, for i=1, 2, . . . , r, satisfying $\omega_i = C^{\lambda_i}$;
   establishing, in the computer processor, a plurality of values $\phi_i$, for i=1, 2, . . . , r, satisfying $$x = \sum_{i=1}^{r} \lambda_i \varphi_i;$$

providing the device with information indicative of the plurality of values $\omega_i$;
providing the device with information indicative of the plurality of values $\phi_i$; and
computing, in the device, $$P = \prod_{i=1}^{r} \omega_i^{\varphi_i},$$

thereby hiding the precise values of the base C and the exponent x from a white-box attack.

2. The method according to claim 1,
wherein the step of establishing a plurality of values $\lambda_i$ comprises establishing a set V of values to be used as the exponent x and establishing a plurality of sets of values $W_1, W_2, \ldots, W_r$ such that $$V \subseteq \left\{ \sum_{i=1}^{r} \lambda_i \cdot w_i \,\Big|\, (w_1, w_2, \ldots, w_r) \in W_1 \times W_2 \times \ldots \times W_r \right\};$$

wherein the step of establishing the plurality of values $\phi_i$, comprises selecting the values $\phi_i$ such that $\phi_i \in W_i$, for $i=1, 2, \ldots, r$;
wherein the method comprises performing the steps of establishing the plurality of values $\phi_i$, providing the device with the information indicative of the plurality of values $\phi_i$, and computing by means of the device, in respect of a plurality of different values $x \in V$.

3. The method according to claim 2, wherein $W_i=\{0,1\}$, for $i=1, 2, \ldots, r$.

4. The method according to claim 1, further comprising establishing the key of the cipher.

5. The method according to claim 1, further comprising selecting different pluralities of values $\lambda_i$ and/or different values r to be used in respect of different devices;
performing in respect of the different devices, using the same values for the base C and the exponent x, and using the different pluralities of values $\lambda_i$ and/or the different values r, the steps of establishing the plurality of values $\omega_i$, establishing the plurality of values $\phi_i$, providing the device with information indicative of the plurality of values $\omega_i$, providing the device with information indicative of the plurality of values $\phi_i$, and computing, by means of the device, $$P = \prod_{i=1}^{r} \omega_i^{\varphi_i}.$$

6. A device comprising a white-box implementation of an exponentiation for computing an outcome of an exponentiation $C^x$ having a base C and an exponent x, the device comprising
a memory for storing a plurality of values $\omega_i$ wherein $\omega_i = C^{\lambda_i}$, wherein $\lambda_i$ is a plurality of values, for $i=1, \ldots, r$, wherein r is an integer and $r \geq 2$,
an input for receiving information indicative of a plurality of values $\phi_i$ wherein $$x = \sum_{i=1}^{r} \lambda_i \varphi_i;$$

a computational unit for computing $$P = \prod_{i=1}^{r} \omega_i^{\varphi_i};$$

wherein the device is arranged for using P as the outcome of the exponentiation $C^x$;
wherein the precise values of the base C and the exponent x are hidden from a white-box attack,
the base C being established in dependence on a key of a cipher, wherein the key of the cipher is to be used by the device for performing a cryptographic operation.

7. The device according to claim 6, wherein the input is arranged for further receiving information indicative of at least part of the plurality of values $\omega_i$.

8. The device according to claim 6, further comprising means for determining at least part of the plurality of values $\omega_i$ in dependence on at least one of: a hardware identifier of the device, a biometric measurement, and a password.

9. The device according to claim 6, further comprising a cryptographic unit for performing a cryptographic operation according to an asymmetric cipher, wherein the cryptographic operation involves the exponentiation $C^x$, wherein the means for performing the cryptographic operation is arranged for using P as the result of the exponentiation $C^x$.

10. The device according to claim 6, wherein the input is arranged for receiving encrypted information indicative of at least part of the plurality of values $\omega_i$ and/or at least part of the plurality of values $\phi_i$, and wherein the device further comprises a cryptographic unit for decrypting the encrypted information to obtain, respectively, the at least part of the plurality of values $\omega_i$ and/or the at least part of the plurality of values $\phi_i$.

11. The device according to claim 6, wherein the device comprises a computer, a PDA, a personal video recorder, a set-top box, or a gaming console.

12. The device according to claim 9, further comprising means for decrypting audio and/or video content using the cryptographic unit.

13. A system for enabling a device to compute an outcome of an exponentiation $C^x$ having a base C and an exponent x by means of a white-box implementation of the exponentiation, the system comprising
a first memory for temporarily storing the base C of the exponentiation and the exponent x of the exponentiation;
a second memory for storing a plurality of values $\lambda_i$, for $i=1, 2, \ldots, r$, wherein r is an integer and $r \geq 2$;
a computational unit for:
establishing the base C in dependence on a key of a cipher, wherein the key of the cipher is to be used by the device for performing a cryptographic operation;
establishing a plurality of values $\omega_i$, for $i=1, 2, \ldots, r$, satisfying $\omega_i = C^{\lambda_i}$;
establishing a plurality of values $\phi_i$, for $i=1, 2, \ldots, r$, satisfying $$x = \sum_{i=1}^{r} \lambda_i \varphi_i;$$

and providing the device with information indicative of the plurality of values $\omega_i$ and information indicative of the plurality of values $\phi_i$, the device computing $$P = \prod_{i=1}^{r} \omega_i^{\varphi_i},$$

thereby hiding the precise values of the base C and the exponent x from a white-box attack.

14. A computer program product stored on a non-transitory memory for enabling a device to compute an outcome of an exponentiation $C^x$ having a base C and an exponent x by means of a white-box implementation of the exponentiation, the computer program product comprising instructions for causing a machine to execute the steps of establishing the base C of the exponentiation in dependence on a key of a cipher, wherein the key of the cipher is to be used by a device for performing a cryptographic operation;

establishing a plurality of values $\lambda_i$, for i=1, ..., r, wherein r is an integer and r≥2;

establishing a plurality of values $\omega_i$, for i=1, ..., r, satisfying $\omega_i = C^{\lambda_i}$;

establishing a plurality of values $\phi_i$, for i=1, ..., r, satisfying $$x = \sum_{i=1}^{r} \lambda_i \varphi_i;$$

providing information indicative of the plurality of values $\phi_i$ and the plurality of values $\omega_i$ to the device, the device computing $$P = \prod_{i=1}^{r} \omega_i^{\varphi_i},$$

thereby hiding the precise values of the base C and the exponent x from a white-box attack.

15. The computer program product according to claim 14, comprising instructions for causing the machine to execute:
establishing the exponent x of the exponentiation.

* * * * *